No. 710,137. Patented Sept. 30, 1902.
O. BOYER.
SEPARATING MECHANISM FOR CORN HUSKING MACHINES.
(Application filed Apr. 11, 1901.)
(No Model.) 5 Sheets—Sheet 1.

Fig. 1.

Oliver Boyer, Inventor

Witnesses
Jas. K. McCathran
Louis G. Julihn

By E. G. Siggers
Attorney

No. 710,137. Patented Sept. 30, 1902.
O. BOYER.
SEPARATING MECHANISM FOR CORN HUSKING MACHINES.
(Application filed Apr. 11, 1901.)
(No Model.) 5 Sheets—Sheet 4.

Fig. 4.

Witnesses
Jas. F. McCathran
Louis G. Julihn

Oliver Boyer, Inventor
By E. G. Siggers
Attorney

No. 710,137. Patented Sept. 30, 1902.
O. BOYER.
SEPARATING MECHANISM FOR CORN HUSKING MACHINES.
(Application filed Apr. 11, 1901.)
(No Model.) 5 Sheets—Sheet 5.

Oliver Boyer, Inventor

UNITED STATES PATENT OFFICE.

OLIVER BOYER, OF LIMA, OHIO, ASSIGNOR, BY DIRECT AND MESNE ASSIGNMENTS, OF ONE-HALF TO WILLIAM H. ORR, OF LIMA, OHIO.

SEPARATING MECHANISM FOR CORN-HUSKING MACHINES.

SPECIFICATION forming part of Letters Patent No. 710,137, dated September 30, 1902.

Application filed April 11, 1901. Serial No. 55,362. (No model.)

*To all whom it may concern:*

Be it known that I, OLIVER BOYER, a citizen of the United States, residing at Lima, in the county of Allen and State of Ohio, have invented a new and useful Separating Mechanism for Corn-Husking Machines, of which the following is a specification.

This invention relates to machines of the type known as "corn-huskers," which are designed to cut and shred the stalks and husks of corn in a manner to effect the separation of the fodder from the ears.

The primary object of the invention is to produce simple and highly effective mechanism for separating from the fodder or chaff such corn as may be shelled from the cob and fed to the machine with the fodder, a further object of the invention being to clean the corn perfectly and to at the same time improve the feed of the husks and stalks from the machine to the pneumatic husk or fodder conveyer constituting an element of the apparatus.

Considered in a somewhat more specific aspect, the object of the invention is to induce a more direct suction or circulation of air through the machine for the removal of the fodder than has heretofore been obtained and to employ in connection with the suction-fan, located and arranged in a novel manner, a blower disposed to direct a current of air toward the fan to facilitate the feed of the husks to the latter and arranged in such relation to the mechanical elements of the separating mechanism as to subject the corn moving to the corn-chute after separation from the husks to the direct action of the blast, so that the blower will perform the dual function of a pneumatic separator and a blast-producing mechanism for assisting in the delivery of the main body of husks to the suction-fan.

A still further object of the invention is to improve the mechanical elements of the separating mechanism so that the main body of husks and stalks will be retained out of the immediate path of the blast at the point where the actual separation and cleaning of the corn is effected and will be deposited directly in the path of said blast at a point immediately beyond the separating mechanism to prevent interference by the husk with the cleaning and separation of the corn from the lighter debris, while at the same time insuring the depositing of the husks in the direct line of the blast at a remote point, so that the latter after being utilized as a cleaning means may impel the main body of husks directly into the range of influence of the husk-removing apparatus.

A still further object of the invention is to so organize the separating mechanism that the corn after being separated from the shucks will be deposited directly in the line of movement of the blast and will be caused to gravitate in a direction opposite to the movement of the blast, so that the corn will travel a considerable distance while directly subjected to the action of a current of air designed to detach and remove such lighter particles as may pass with the corn through the screen prior to the delivery of the corn to suitable elevating mechanism designed to convey it to a point adjacent to the rear of the machine for delivery.

Other and subordinate objects of the invention will hereinafter more fully appear as the necessity for their accomplishment is developed in the succeeding description, which is directed especially to the preferred form of my invention illustrated in the accompanying drawings and embraced within the scope of the appended claims.

In said drawings.

Referring to the numerals employed to designate corresponding parts throughout the views, 1 indicates a portion of a husking-maching of ordinary construction designed to shred the husks and stalks and to effect their detachment from the ears and equipped, as usual, with a husk conveyer or carrier 2, arranged ordinarily to convey the husks, stalks, and shelled corn to the husk chute or conveyer, the husk-carrier 2 being in the form of an endless belt and supported at its rear end by a belt-roller 3, carried by a shaft 4. The shaft 4 is usually provided with a sprocket-wheel 5, geared through the medium of a sprocket-chain 6 with a sprocket-wheel 7, mounted upon a shaft 8, constituting a part of the husking mechanism and geared in the usual manner to a power-shaft 9, from which motion is communicated to the several operating members. In carrying out the present invention, however, the various appliances which have been employed behind the rear end of the husking-machine proper are omitted and in lieu thereof the separating mechanism constituting my invention is substituted, or if the mechanism is constructed with the machine instead of being designed as an attachment thereto the bottom sills 10 of the machine 1 are extended rearwardly to constitute the sills of the frame 11 of my separator, in either event the rear truck 12 being moved rearwardly beyond its usual position to constitute a support for the mechanism to be described. The frame 11 of the separator is of a size sufficient to constitute, in effect, a continuation of the body of the machine, and when it is applied as an attachment frame-plates 13 are designed to be employed to rigidly connect the front end of the frame 11 with the rear end standards of the machine-frame 1. At the extreme rear end of the frame 11 is disposed the casing of what I shall term the "suction-fan" 14. This casing constitutes the end of the separating-chamber defined within the frame and has its inner wall formed with an extended opening 15, constituting a mouth through which the fodder is designed to pass, in a manner to be described, into the direct range of influence of the fan 14, mounted within the casing upon a horizontal rearwardly-extending fan-shaft 17, geared, as through bevel-gearing 18, with a laterally-extending shaft 19, provided with a belt-pulley 20, belted through the medium of a belt 21 to a belt-pulley 22 upon any extended shaft of the corn-husker, but preferably on the shaft 9. The particular location of this fan should be specially noted, because it produces a direct circulation of air from the machine to the interior of the fan-casing without deflection of the current, which deflection is a usual and, it is thought, an objectionable feature of the usual types of machines of this character, wherein, as is well understood in the art, the blower is ordinarily applied at one side of the machine instead of directly at the end thereof, from which point a direct circulation can be induced.

The fan 14 is preferably in communication with a tubular husk-conveyer 23; but it is evident that other forms of conveyers may be substituted therefor. At the top of the fan-casing is disposed an inwardly-extending substantially horizontal hood 24, and in advance of the opening 15 into the casing a husking-chamber 25 is formed by a pair of vertically-disposed deflecting-plates 26, converging toward the opening 15, and a bottom plate 27, supported in any suitable manner, but located substantially on a level with the bottom of the opening 15. The husk-chamber 25 may be formed, however, in a number of other ways than by the arrangement of plates as described, it being simply necessary to provide in addition to the suction-fan an inclosed space within the direct influence of the fan for the reception of the husks fed rearwardly by mechanical means in a manner to be described. Between the chamber 25 and the rear end of the machine 1 the mechanical elements of the separating mechanism are located. These elements comprise a vibratory separating-rack 28, having its front end located below the discharge end of the carrier 2 of the machine and designed to receive and to transfer the husks and stalks from the machine to the chamber 25. The separating-rack 28 is upwardly inclined toward the rear end of the separating-chamber and is constructed in a manner to permit the shelled corn held by the husks to gravitate through the rack upon a cleaning-screen 29, disposed horizontally below the rack and constructed and operated in a manner to be more fully explained.

The rack 28 comprises a slatted bottom, between the separated or spaced slats 30 of which extend the screen-bars 31, designed to constitute a coarse screen permitting the gravitation, as stated, of the shelled corn and such lighter portions of the chaff as may adhere thereto. The opposite sides of the rack are guarded by side bars 32, and above the slatted bottom are disposed a series of preferably equidistant longitudinally-disposed toothed rack-bars 33, the teeth of which are formed with abrupt vertical rear faces 34 and gradually-inclined front or upper faces 35, the form of these teeth serving as the rack is vibrated or reciprocated to effect a positive feed of the husks toward the rear end of the separator, where they are finally deposited into the husk-chamber 25 within the direct range of the current of air induced by the fan 14.

Figure 1:
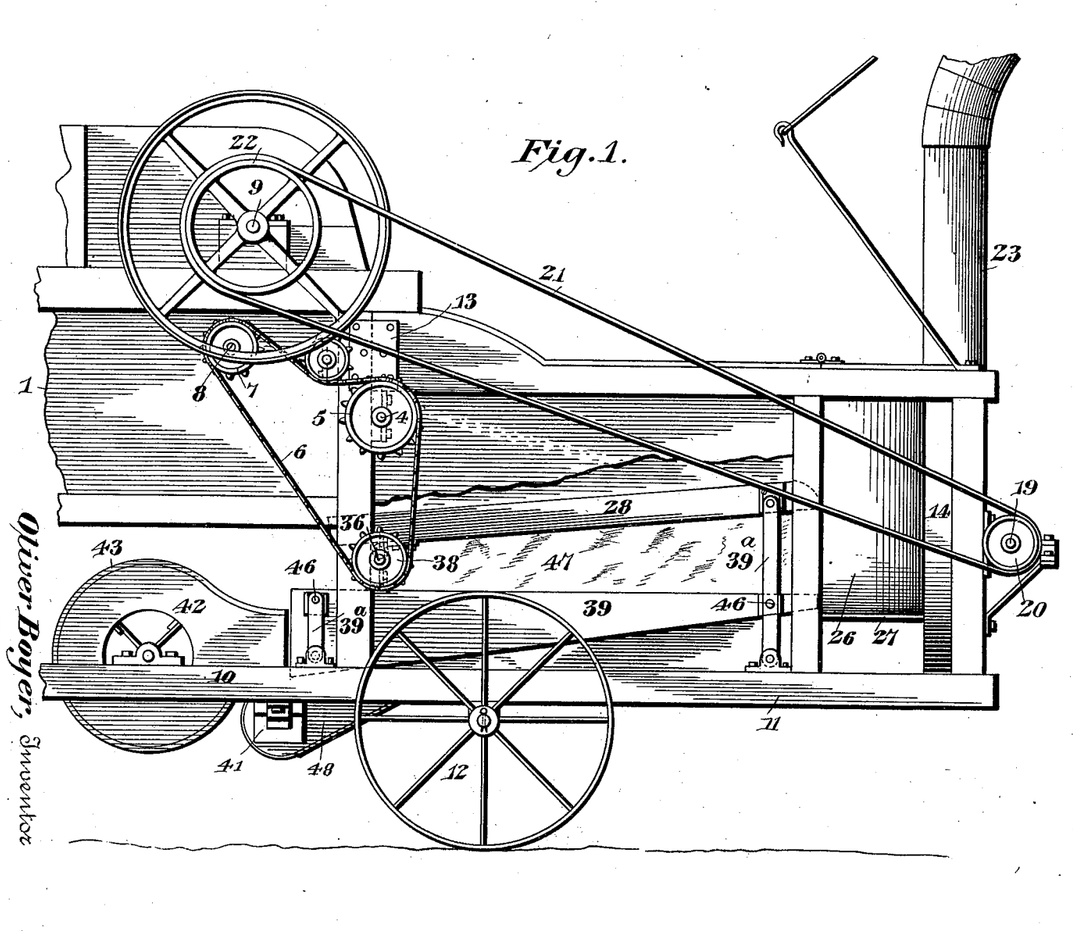
Figure 1 is a side elevation of so much of a corn-husking machine as is necessary to illustrate the construction and relation of my separating mechanism, parts being broken away.

The means for producing the necessary vibratory movement of the separating-rack may be varied within wide limits, but preferably consists of a crank-shaft 36, the cranks of which are provided in a well-understood manner with bearings 37 on the under side of the rack, the shaft 36, which I shall hereinafter term the "rack-shaft," being provided upon one end with a sprocket-wheel 38, over which the chain 8 may be passed, as more clearly shown in Fig. 1 of the drawings. The front end of the rack 28 is supported by a pair of upstanding swinging arms or links 39ª, having pivotal connection at their upper ends with the rack and supported at their lower ends in suitable bearings mounted, preferably, upon the sills 10. It will now appear that as the husking-machine is operated rotary motion will be imparted to the crank-shaft 36, and as the husks are deposited upon the rack from the carrier 2 they will be gradually fed rearwardly by the vibration of the rack, said vibration not only effecting the feed of the husks, but also serving to effectually separate the latter in a manner to permit the gravitation of the shelled corn between the screen-bars of the rack and through the cleaning-screen 29 of what may be termed a "riddle-shoe" 39. The riddle-shoe 39 has the general form of a trough having an inclined bottom 40 extending downwardly from the inner end of the bottom wall 27 of the chamber 25 to the rear side edge of the corn-chute 41, the cleaning-screen 29 constituting, in effect, the top of the riddle-shoe and converging to the bottom 40 at the rear end of the latter. The screen 29, as already stated, maintains a substantially horizontal position; but the inclination of the bottom wall 40 of the shoe is such as to present it substantially in parallelism with the rack 28 for the purpose of defining between the bottom wall 40 of the shoe and said rack a rearwardly-extending upwardly-inclined blast chamber or conduit, through which a blast is designed to be projected from a blower 42, the casing 43 of which is provided with a rearwardly-disposed spout 44, resting upon the front side wall of the corn-chute 41 and directed into the rear end of the riddle-shoe 39, so that the blast induced by the blower 42 is projected rearwardly into the open rear end of the shoe and is caused to pass through the latter and through the cleaning-screen 29 in a direct line with the suction-fan—that is to say, the blower is disposed to direct a blast through the separating-chamber and directly into the mouth or opening of the fan-casing, so that the discharge of the husks from the husk-chamber 25 is effected by the combined action of the fan and blower, and in this connection the necessity for the provision of the chamber 25 will be most clearly apparent. It will be seen that the blast from the blower is designed primarily for the cleaning of the corn as it drops into the riddle-shoe; but an almost equally important function of the blower is to assist in the removal of the husks. It is for this reason that the separating-rack 28 is located in the manner specified, so that while the blast is effecting the detachment and rearward conveyance of the lighter particles adhering to the corn the husks are held out of interfering relation to said blast, but are subsequently discharged from the rear end of the rack and are permitted to gravitate into the direct path of the secondary blast at a point removed from interference with the proper separation and cleaning of the corn.

It is obviously necessary to impart some vibratory movement to the riddle-shoe 39, and this is preferably done by pivoting the end thereof to the upstanding links or arms 39ª of the rack, as indicated at 45, the front end of the riddle-shoe being preferably extended somewhat beyond the front end of the rack and supported upon swinging links 46, mounted upon the sills 10 and of a proper length to maintain the cleaning-screen 29 in a horizontal plane at all times during the vibration of the riddle. For the purpose of confining the blast to prevent its dissipation at the sides of the separator flexible side walls or curtains 47 are preferably disposed between the separating-rack and the riddle-shoe; but if the frame of the separator is made sufficiently tight this precaution may be omitted. The corn-chute 41, disposed to receive the shelled corn from the riddle-shoe 39, extends transversely of the machine-frame entirely across the same, and its bottom wall is inclined longitudinally for the purpose of effecting the delivery of the corn to the interior of the elevator-casing 48, located beyond one side of the separator and containing an endless conveyer 49, of bucket or other form, designed to elevate the corn to a discharge-spout 50, located adjacent to the rear end of the machine, at the top thereof. A preferable means for communicating motion to the elevator or conveyer 49 consists in gearing one of the shafts of said elevator, through the medium of suitable belt-pulleys and a belt 51, with the crank-shaft 36, the latter being likewise belted, through the medium of a belt 52, to the shaft 53 of the secondary blower 42.

The action of my novel separating mechanism is as follows: The harvested corn is deposited in the machine 1, and the ears are separated from the chaff by the shredding and cutting of the husks and stalks in a manner well understood in the art. The more or less violent handling of the corn within the machine serves, however, to shell or detach a considerable number of grains from the ears, and this shelled corn is conveyed from the machine, with the husks and stalks, by the carrier 2 and is precipitated, with the husks, upon the separating-rack 28. The vibration of the rack, receiving its motion in the manner described, effects the rearward feed of the husks and at the same time separates them to insure the dropping of the shelled corn through the rack and into the direct range of the blast from the blower 42, which is projecting the blast toward the rear of the separator and immediately below the rack.

Figure 2:
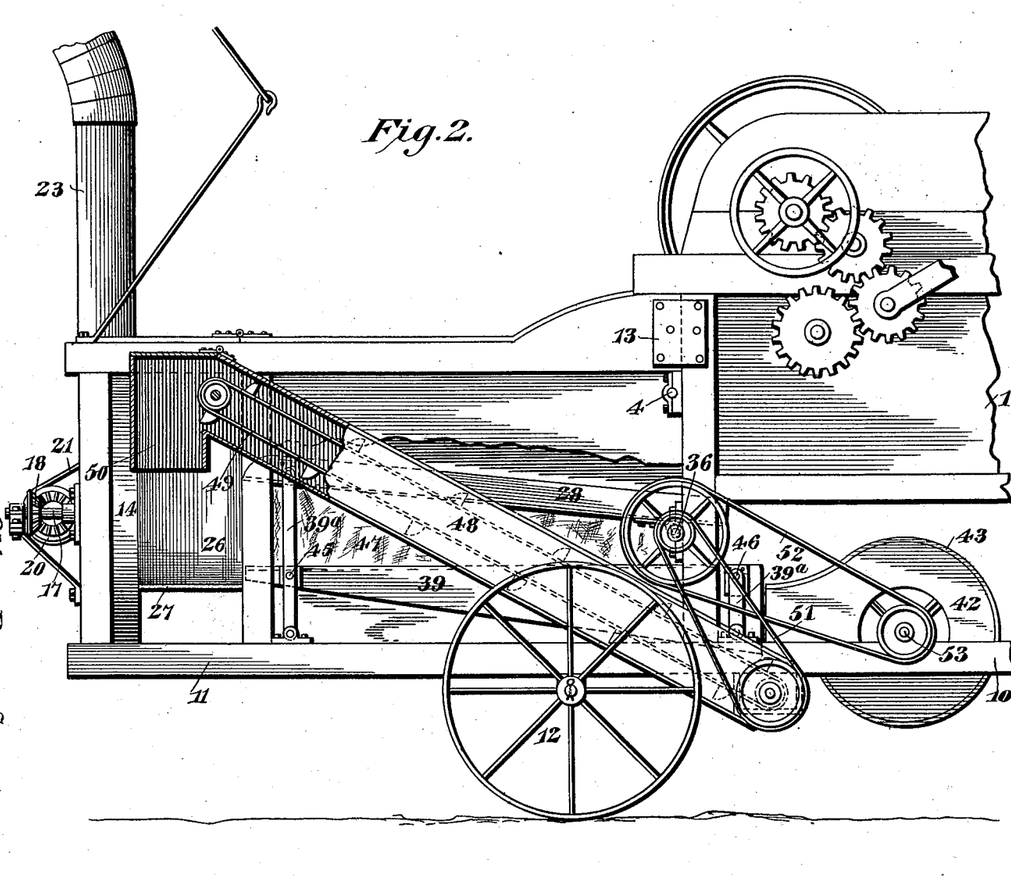
Fig. 2 is a similar view of the opposite side of the subject-matter of Fig. 1.
Figure 3:
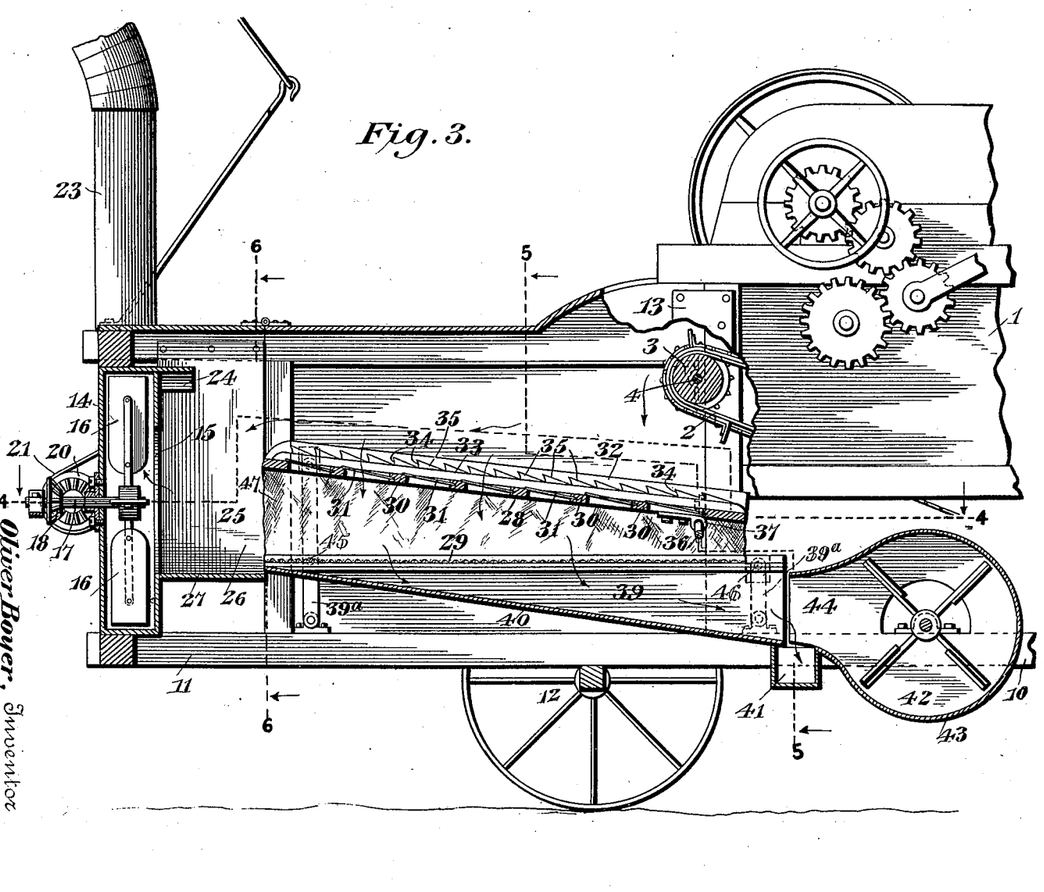
Fig. 3 is a central longitudinal section through the separator, showing parts of the husking-machine in elevation.
Figure 4:
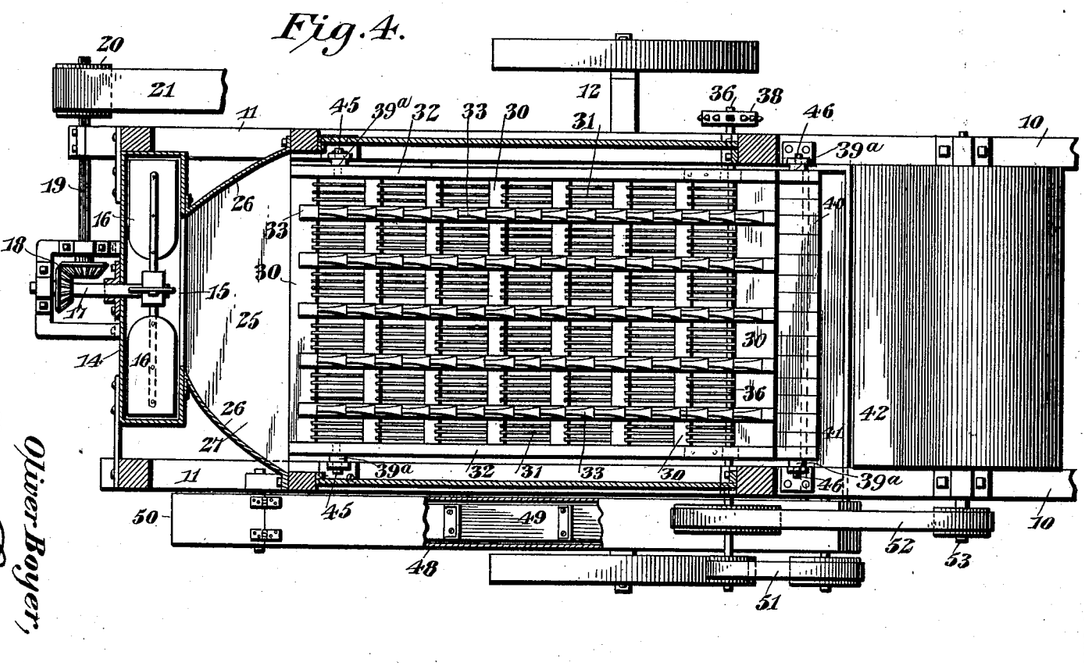
Fig. 4 is a horizontal section through the subject-matter of Fig. 3.
Figure 5:
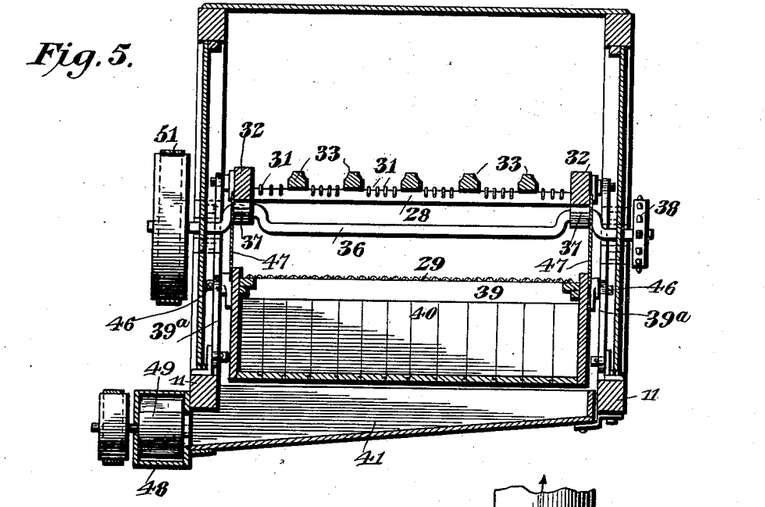
Fig. 5 is a vertical transverse section on the line 5 5 of Fig. 3.
Figure 6:
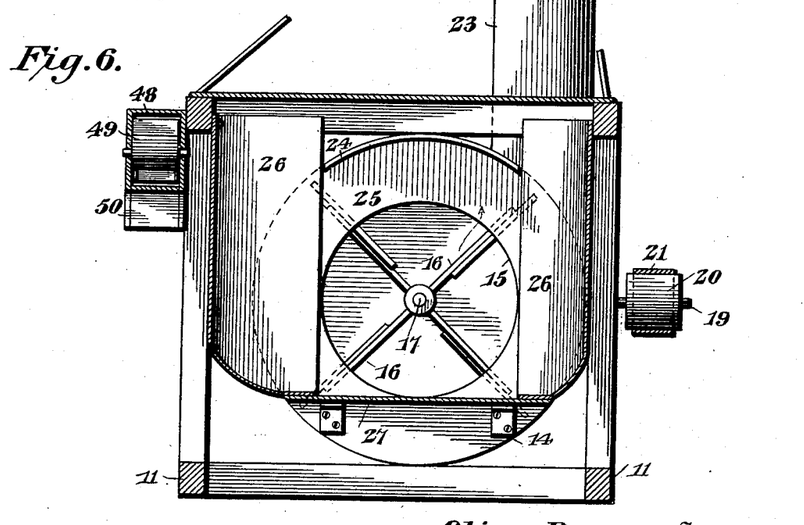
Fig. 6 is a similar view on the line 6 6 of Fig. 3.

While the rack is effective for the purpose of causing the separation of the shelled corn from the husks and stalks, a considerable amount of light chaff is apt to fall below the rack with the corn and if not carried rearwardly at once by the auxiliary blast will be caught upon the screen 29 of the riddle, which latter is of such mesh as will permit the corn to drop freely into the riddle-shoe and to gravitate down the inclined bottom thereof to the corn-chute 41. If, as stated, the chaff dropping upon the screen 29 is too heavy to be at once carried back by the blast from the blower 42, it will be deposited upon the screen and will gradually move back toward the husk-chamber 25 by the continued action of the blower. It should be noted that the corn dropped through the separating-rack 28 passes transversely across the blast from the blower 42 until the inclined bottom wall 40 of the riddle-shoe is reached. The course followed by the corn is then changed, and it gravitates down the wall 40 directly in the face of the blast—that is to say, the corn passing through the riddle-shoe to the corn-chute 41 moves in a direction directly opposite to the line of movement of the blast projected rearwardly by the blower—and is consequently subjected to the direct action of the blast for such considerable period as will absolutely insure the detachment and complete removal of any particles which may adhere to the grains or may find its way with the grain through the riddle-screen 29. In this manner the separation and cleaning of the corn is effected in a thorough manner, and as the blast from the blower 42 is projected directly toward the suction-fan 14 the husks when they reach the rear end of the rack will be precipitated into the husk-chamber 25 directly into the blast from the blower at a point beyond the separating mechanism and between the latter and the fan. Therefore the blast, having performed its function in connection with the cleaning of the corn, is utilized to drive the husks into the fan-casing, and thereby augment the suction induced through the separator by the rotation of the fan 14, which latter after the husks have been drawn into the casing will cause their conveyance through the tubular conveyer 23 to a suitable fodder-stack or other point of delivery. While such delivery of the fodder and stalks is being effected through the conveyer 23 the cleaned corn deposited in the chute 41 will gravitate to one side of the machine and will be carried by the elevator 49 to the delivery-spout 50. (Best illustrated in Fig. 2 of the drawings.)

From the foregoing it will appear that I have produced a simple and effective form of separating mechanism for corn-husking machines; but while the present embodiment of the invention is believed at this time to be preferable I do not desire to limit myself to the details of construction illustrated and described, as, on the contrary, I desire to be distinctly understood as reserving to myself the right to effect such changes, modifications, and variations thereof as may fall within the scope of the protection prayed.

What I claim is—

1. In a separating mechanism for husking-machines, the combination with a separating-rack designed to receive the husks and to permit the gravitation of the shelled corn, of a blower disposed to project a blast below the separating-rack to clean the corn as the latter is precipitated into the blast, a suction-fan located in a direct line with the blast from the blower, and means intermediate of the separating-rack and fan for sustaining the husks in a plane below the rack and in position to be fed to the fan by the blast from the blower.

2. In separating mechanism for husking-machines, the combination with a vibratory separating-rack designed to receive the husks, and a vibratory riddle-shoe disposed below the rack, of a blower disposed to project a blast endwise between the riddle-shoe and the rack to effect the cleaning of the corn as it drops into the shoe from the rack and to remove the husks as the latter are dropped into the direct range of the blast from the end of the rack opposite the blower.

3. In separating mechanism for husking-machines, the combination with a vibratory separating-rack and a vibratory riddle-shoe, of a husk-chamber located beyond one end of the rack with its bottom disposed in a plane below the rack, a blower disposed to project a blast endwise between the rack and shoe and through the husk-chamber, and a suction-fan located beyond the husk-chamber to receive the husks expelled therefrom by the blast from the blower.

4. In separating mechanism for husking-machines, the combination with a separator-casing and separating mechanism therein comprehending means for mechanically feeding the husks endwise of the casing, of a husk-chamber disposed beyond the separating mechanism and having its bottom disposed in a plane below said mechanical feeding means, a blower located at or adjacent to the front end of the casing likewise below said mechanical feeding means and disposed to direct a blast of air through the separating mechanism and husk-chamber, and a suction-fan located in the direct line of blast from the blower, and disposed at the rear side of the husk-chamber.

5. In separating mechanism for corn-husking machines, the combination with a vibratory separating-rack designed to receive the husks and to feed them toward the end of the rack, of a vibratory riddle-shoe located below the rack and having an inclined bottom disposed to facilitate the discharge of corn at the end of the riddle-shoe opposite the end of the rack at which the husks are discharged, a blower disposed at or adjacent to the discharge end of the riddle-shoe to direct a blast therethrough in opposition to the corn moving toward the discharge end of the chute, whereby the blast after performing its function as a cleaning agent for separating the corn, assists in removing the husks as the latter gravitate into the blast at the rear end of the rack and a suction-fan disposed beyond the rack to receive the husks blown back by the first-named blower.

6. In separating mechanism for corn-husking machines, the combination with a vibratory rack, and an upstanding swinging support for one end thereof, of a riddle-shoe disposed below the rack and having pivotal connection at one end with said upstanding swinging support, a swinging link supporting the opposite end of the riddle-shoe, and means for imparting motion to the rack.

7. In separating mechanism for corn-husking machines, the combination with a separator-casing, separating mechanism therein comprising a longitudinally-inclined separating-rack and a riddle-shoe disposed below the rack and having a longitudinally-inclined bottom wall and a horizontal screen constituting the top of the shoe, of means located below the discharge end of the riddle-shoe to receive the corn therefrom, a vertically-disposed suction-fan located beyond the separating mechanism to receive the husks, and a blower located to project a blast of air into the discharge end of the riddle-shoe and into the fan located therebeyond and means for sustaining the husks in a plane below the rack and in position to be fed to the fan by the blast from the blower.

8. In separating mechanism for corn-husking machines, the combination with a vibratory separating-rack, of a vibratory riddle-shoe disposed therebelow, flexible vertical side walls extending between the rack and shoe, and a blower located at one end of the riddle-shoe and disposed to project a blast of air through the space defined by the riddle-shoe, rack and flexible side walls.

9. In a separating mechanism for husking-machines, the combination with a separator-casing, of a suction-fan disposed directly across the rear end thereof, means for feeding the material to be separated into the casing at its front end, a separating-rack disposed longitudinally of the casing to convey the husks toward the rear end thereof, a husk-chamber located intermediate of the rack and suction-fan and having its bottom disposed in a horizontal plane below the rack, a riddle-shoe located below the rack and having its bottom wall inclined downwardly from the bottom of the husk-chamber to the front end of the separator-casing, and a blower located beyond the front end of the casing and disposed to direct a blast longitudinally between the separator and the bottom wall of the riddle-shoe and through the husk-chamber to the suction-fan.

10. In a separating attachment for corn-husking machines, the combination with a separator-casing, of a suction-fan disposed at one end of the casing, a blower located at the opposite end of the casing and projecting a blast directly into the suction-fan, and separating mechanism disposed above the blower and spaced from the suction-fan to permit the husks to drop from the rear end of the separating mechanism and into the blast of air projected from the blower to the suction-fan.

11. A separating-rack for corn-husking machines comprising an open frame, a series of separated transverse slats extending across the frame and fixed thereto, a series of longitudinally-disposed toothed rack-bars carried by the frame above the slats, and screen-bars disposed longitudinally of the frame and extending between the slats in the intervals between the toothed bars.

12. A separating-rack for corn-husking machines comprising an open frame, a series of separated transverse slats extending across the frame and fixed thereto, a series of longitudinally-disposed toothed bars carried by the frame above the slats, the teeth of said bars being directed toward the rear end of the rack, screen-bars disposed longitudinally of the frame and extending between the slats in the intervals between the toothed bars, said screen-bars having their front ends driven into a slat and their rear ends resting upon the next succeeding slat.

13. In separating mechanism for corn-husking machines, the combination with a separator-casing, and separating mechanism therein including a longitudinally-inclined open-work supporting-rack, and a riddle-shoe disposed below the rack and having a longitudinally-inclined bottom wall, and a horizontal screen constituting the top of the shoe and of a length at least equal to the length of the rack, of means for imparting vibratory movement to the rack and shoe, means located beyond the discharge end of the riddle-shoe to receive the corn therefrom, a blower located to project a blast of air into the discharge end of the riddle-shoe, through the screen thereof and rearwardly between the rack and shoe, and conveying means located beyond the rear end of the rack, said conveying means being so located that the husks delivered from the rear end of the rack will fall into the blast from the blower, whereby said blast will assist in the delivery of the husks to the conveying means.

14. In separating mechanism for corn-husking machines, the combination with a vibratory supporting-rack, of a vibratory riddle-shoe disposed therebelow, flexible side walls extending between the rack and shoe, a blower located at one end of the riddle-shoe and disposed to project a blast of air through the space defined by the riddle-shoe, rack and flexible walls, and conveying means located beyond the rack to effect the removal of the husks, said conveying means being so disposed that the delivery of the husks thereto will be assisted by the blast from the blower.

15. In separating mechanism for corn-husking machines, the combination with a separator-casing, of a blower, a conveyer located directly in the blast from the blower, and separating mechanism located in a plane above the blower and having its discharge end spaced from the conveyer, to permit the husks to drop from the end of the separating mechanism into the blast and be blown back to the conveyer with the light particles previously separated from the falling corn by the blast.

16. In a separating attachment for corn-husking machines, the combination with a separator-casing, of a conveyer located at one end of the casing, a blower located at the opposite end of the casing and projecting a blast directly to the conveyer, and separating mechanism disposed above the blower and spaced from the conveyer, to permit the husks to drop from the rear end of the separating mechanism into the blast of air projected from the blower to the conveyer.

17. In separating mechanism for corn-husking machines, the combination with a casing, of a blower, a conveyer located directly in the blast therefrom, and separating mechanism intermediate of the blower and conveyer, said separating mechanism comprising an inclined separating-rack disposed in a plane above the blower and having its discharge end spaced from the conveyer, to permit the husks to drop from the end of the rack into the blast, a riddle-shoe disposed below the rack and having its bottom wall downwardly inclined toward the blower, and a horizontal screen constituting the upper wall of the riddle-shoe and intersecting the line of the blast, whereby the blast from the blower serves first to clean the dropping corn and to blow the light particles back into the body of husks falling from the end of the rack and delivered by the blast to the conveyer.

In testimony that I claim the foregoing as my own I have hereto affixed my signature in the presence of two witnesses.

OLIVER BOYER.

Witnesses:
WALLACE LANDIS,
WALTER K. CAMPBELL.